ns Patent [19]

Leiber

[11] Patent Number: 4,655,512
[45] Date of Patent: Apr. 7, 1987

[54] BRAKE SYSTEM HAVING A BRAKE BOOSTER

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 788,320

[22] Filed: Oct. 17, 1985

[30] Foreign Application Priority Data

Nov. 9, 1984 [DE] Fed. Rep. of Germany ....... 3440972

[51] Int. Cl.$^4$ .............................................. B60T 8/10
[52] U.S. Cl. ...................................... 303/114; 303/92
[58] Field of Search ............................ 303/91, 92, 114

[56] References Cited

U.S. PATENT DOCUMENTS

| 3,922,023 | 11/1975 | Harries | 303/21 |
| 3,927,915 | 12/1975 | Adachi | 303/21 |
| 4,111,496 | 9/1978 | Leiber | 303/92 |
| 4,462,642 | 7/1984 | Leiber | 303/92 |
| 4,568,130 | 2/1986 | Leiber | 303/114 |

Primary Examiner—Duane A. Reger
Assistant Examiner—Matthew C. Graham
Attorney, Agent, or Firm—Edwin E. Greigg

[57] ABSTRACT

A brake system having a master cylinder including main pistons, a brake booster for displacing the main pistons a brake valve for controlling the brake booster and a pressure supply device. The brake booster has a booster cylinder and a booster piston which is displaceable into the booster cylinder. The booster piston divides a booster chamber from an auxiliary chamber, which is located between the booster piston and the master cylinder. A first valve assembly and a second valve assembly are provided. The second valve assembly is located between the pressure supply device and the brake valve as well as a connection associated with the booster chamber. The first valve assembly is intended for relieving pressure in the booster chamber in favor of a return line or to join it with the pressure supply device. In the anti-skid mode, pressure in the booster chamber is initially reduced by means of the second valve assembly. This is effected by blocking the inflow of pressure medium to the brake valve and by relieving pressure in the booster chamber. If the drop in brake pressure attainable thereby should be inadequate, then by means of the first valve assembly, pressure medium is directed out of the pressure supply device into the auxiliary chamber. This pressure displaces the booster piston toward its initial position. As a result, a pressure drop down to zero is possible, no matter how severely a brake pedal coupled with the brake valve is depressed.

21 Claims, 3 Drawing Figures

BRAKE SYSTEM HAVING A BRAKE BOOSTER

BACKGROUND OF THE INVENTION

The invention is based on a brake system having a brake booster. Known prior art brake systems are suitable for reducing undesirable slip when vehicle wheels are braked. If prior art brake systems have a hydraulic brake booster, they can also be expanded into a brake system that automatically sets a minimum distance between a vehicle having this system and the vehicle ahead, and/or into a brake system that reduces the slip of the driving wheels. The disadvantage in such brake systems is that in the anti-slip mode, a pump supplying the brake system must pump undesirably large quantities of pressure medium at high pressure. Such pumps are correspondingly large and expensive and require a large amount of electrical energy. A pump of this kind is also disturbingly noisy.

OBJECT AND SUMMARY OF THE INVENTION

A brake system in accordance with this invention has the advantage over the prior art that less energy is needed in furnishing a pressure medium in the anti-slip mode, and thus a less expensive pump is capable of adequately supplying the brake system. The brake system can also be embodied such that a low-pressure pump, which generates less disruptive noise, can be used.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
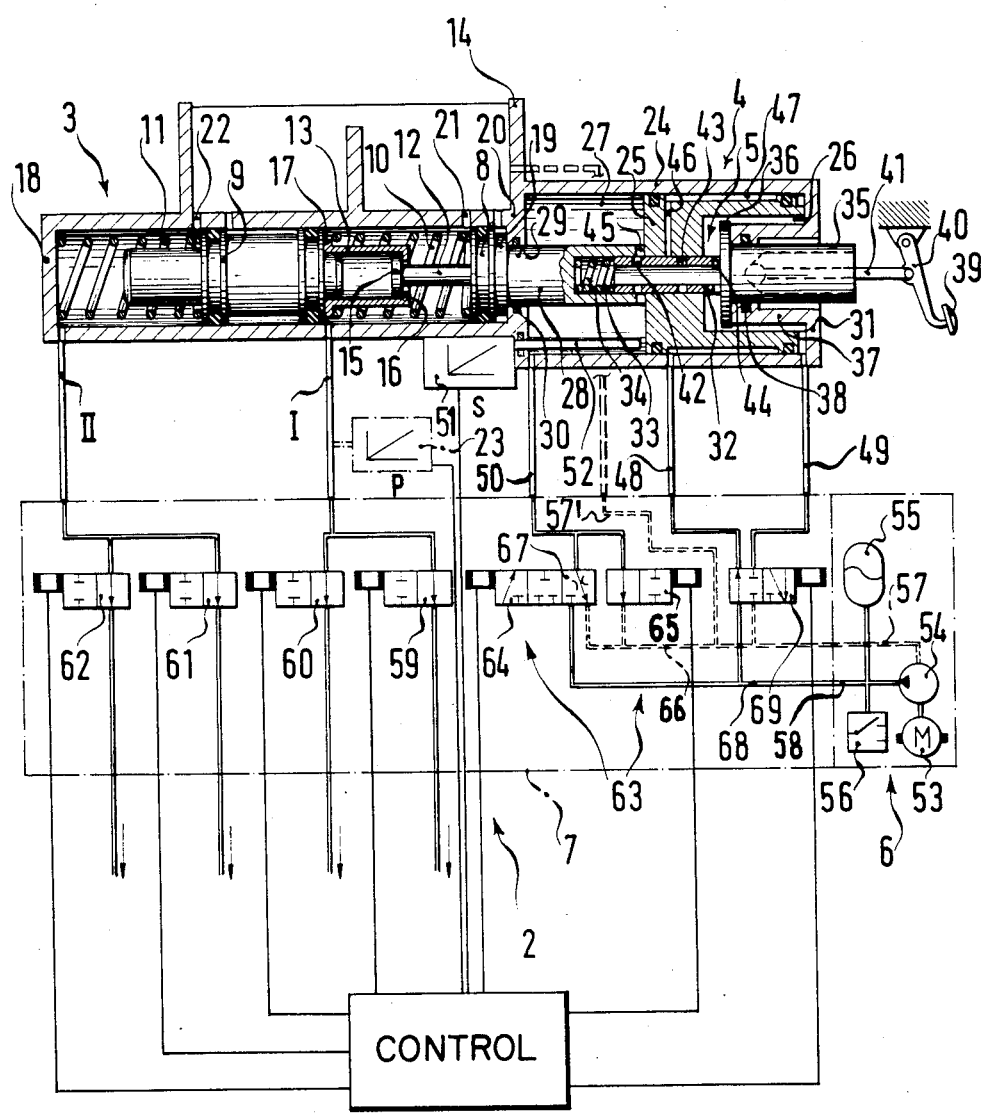
FIG. 1 is a simplified representation of a first exemplary embodiment of the brake system according to the invention.

The first exemplary embodiment of the brake system 2, shown in FIG. 1, has a master cylinder 3, a hydraulic brake booster 4, a brake valve 5, a pressure supply device 6 and a valve block 7, as well as wheel brake cylinders, not shown, which are of a design known in the prior art.

The master cylinder 3 has a first main piston 8, a second main piston 9, two piston restoring springs 10, 11, a tension rod 12, a prestressing sleeve 13 and a refill container 14. The main pistons 8 and 9 are displaceable in a tandem arrangement inside the main cylinder 3. The main piston 8 bears the tension rod 12, which extends toward the second main piston 9. The tension rod 12 has a head 15, which is longitudinally displaceable inside the prestressing sleeve 13. The prestressing sleeve has an inwardly extending collar 16, which engages the head 15 from behind in the vicinity of the tension rod 12. The prestressing sleeve 13 also has an offstanding flange 17 extending radially outward. This flange 17 is spaced farther apart from the main piston 8 than is the collar 16. The piston restoring spring 10 is installed in its prestressed condition between the flange 17 and the first main piston 8. The tension rod 12, the prestressing sleeve 13 and the head 15 limit the expansion of the piston restoring spring 10. The other piston restoring spring 11 is installed between the second main piston 9 and an end wall 18 of the master cylinder 3. Both piston restoring springs 10 and 11 effect a return of the two main pistons 8 and 9 into the initial positions shown; an extension 19 formed onto the main piston 8 rests on a second end wall 20 of the main cylinder 3. The master cylinder 3 communicates with the refill container 14 via expansion ports 21, 22. Two brake circuits I and II are connected to the master cylinder 3. A brake pressure sensor 23 may be connected to the brake circuit I, as will be described in detail hereinafter.

The brake booster 4 has a booster cylinder 24, a booster piston 25, a booster chamber 26, an auxiliary chamber 27 and an auxiliary piston 28. The auxiliary piston 28 is aligned coaxially with the first main piston 8 and the booster piston 25; it is located between these two pistons 8, 25 and is connected to the booster piston 25. The end wall 20 has an opening 29, through which the auxiliary piston 28 is displaceable. A sealing ring 30 which surrounds the auxiliary piston 28 prevents leakage of fluid from the refill container 14 to the auxiliary chamber 27. Opposite the auxiliary chamber 27, the booster chamber 26 adjoins the booster piston 25. The booster chamber 26 extends as far as an end wall 31 of the booster cylinder 24.

The brake valve 5 has a control bushing 32, which is longitudinally displaceable inside a control cylinder 33 of auxiliary piston 28. The control cylinder 33 is preferably integrally embodied with the booser piston 25 and its auxiliary piston 28. A restoring spring 34 is inserted into the control cylinder 33 and urges the control bushing 32 in the direction of the end wall 31. The control bushing 32 is connected to a hollow tappet 35, which protrudes beyond the end wall 31. At its transition to the control bushing 32, the tappet 35 has a stop collar 36, which extends radially outward in the manner of a flange. The hollow tappet 35 is displaceable inside a tubular extension 37. This tubular extension 37 begins at the end wall 31 and points toward the master cylinder 3. The extension 37 has a sealing ring 38, which sealingly surrounds the tappet 35. A brake pedal 39 is secured to a pedal lever 40. Coupled with the pedal lever 40 is a pedal tappet 41, which extends into the tappet 35. The booster piston 25 includes an axial bore on its side oriented toward the end wall 31, in such a way that when displaced toward the end wall 31 it surrounds the tubular extension 37 with radial play. This has the advantage that the brake booster 4 can have a short structure, which saves space.

The control sleeve 32 has control bores 42 and 43 and connecting bores 44. Associated with the control bores 42, are control bores 45 in the auxiliary piston 28, which discharge into the auxiliary chamber 27 and are intended for relieving pressure in control sleeve 32. An inflow bore 46 is associated with the control bore 43 and extends inside the booster piston 25 to a circumferential groove 47, which is machined into the booster piston 25. Associated with this circumferential groove 47 is a pressure supply connection line 48 on the booster cylinder 24. The connecting bores 44 connect the booster chamber 26 with the control bores 42, 43, passing through the control bushing 32. In the vicinity of the end wall 31, the booster chamber 26 has a connection line 49. Near the end wall 20, the auxiliary chamber 27 also has a fluid line connection 50.

A piston travel sensor 51 is associated with the brake booster 4. The piston travel sensor 51 is preferably disposed underneath the master cylinder 3. A sensor tappet 52 is disposed between the piston travel sensor 51 and the booster piston 25. This sensor tappet 52 is aligned parallel with the auxiliary piston 28 and extends through the auxiliary chamber 27. The piston travel sensor 51 can be provided either instead of or in addition to the brake pressure sensor 23. The travel sensor is actuated by the sensor tappet which is moved by the piston 25 to denote that piston 25 has moved as it should during operation.

The pressure supply device 6 includes a pump 54 of known type, which is drivable via a motor 53, and a pressure reservoir 55, a pressure switch 56, a return line 57 and a pressure supply line 58. The return line 57 communicates with the valve block 7 and is connected to the refill container 14 via line 57' and the brake master cylinder 3. The pressure supply line 58 is also connected to the valve block 7 and to the fluid line 50 via control valves 64 and 65. The pressure switch 56 controls the motor 53 in a known manner.

The valve block 7 includes brake pressure maintenance valves 59–62 of a known type, electromagnet type, which are connected to the brake circuits I and II. These brake pressure maintenance valves 59–62 are embodied as 2/2-way electromagnetic controlled valves and in their basic position are open so that brake fluid passes through the valves to the wheel cylinders. Wheel brake cylinders of a known type are connected to the brake pressure maintenance valves 59–62 in a known manner, not shown.

Also located inside the valve block 7 is a first, electromagnetically actuatable valve assembly 63. This first valve assembly 63 preferably includes a multi-position valve 64 and operationally parallel to it a safety valve 65. The multi-position valve 64 is preferably embodied as a 3/3-way valve and in its basic position it connects the auxiliary chamber 27 of the master cylinder with a line 66, which communicates with the return line 57 of the pressure supply device and likewise acts as a return line. The multi-position valve 64 may contain a throttle 67 that is effective for this basic position. A pressure line 68 leading inside the valve block 7, which is supplied by the pressure supply line 58 of the pressure supply device 6, is blocked when the multi-position valve 64 is in its basic position. A first control position of the multi-position valve 64 blocks the connection 50 of the auxiliary chamber 27 from the return line 57 and the pressure supply line 58. In a second switching position, the multi-position valve 64 connects the pressure supply line 58 with the line 50 to the auxiliary chamber 27 but disconnects the line 50 from the return line 57.

The safety valve 65 is embodied as a 2/2-way valve, and in its basic position it is open. In this position, it connects the auxiliary chamber 27 via line 50 to the return line 57. In its switching position, the safety valve 65 prevents pressure from flowing out of the auxiliary chamber 27 into the return line 57.

A second, preferably electromagnetically actuatable valve assembly 69 is embodied as a 4/2-way valve and is located beween the pressure supply connection 48, the connection 49 of the booster chamber 26, the return line 57 and the pressure supply line 58. In its basic position, the valve 69 joins the pressure supply connection 48 with the pressure supply line 58 and closes the connection 49. In its switching position, the 4/2-way valve 69 joins the connections 48 and 49 with the return line 57. The pressure supply connection 48 is then disconnected from the pressure line 68 or the pressure supply line 58.

Mode of Operation of the First Exemplary Embodiment

Before the brake system 2 is put into operation, the valves 59–62 and 64, 65 and 69 are in the basic positions as described above. As long as the brake pedal 39 is not actuated, the inflow bore 46 is blocked by means of the control bushing 32. The booster chamber 26 communicates with the auxiliary chamber 27 through the connecting bores 44, extending through the control bushing 32 and the control bore 42 and through the control bore 45. As a result, the booster chamber 26 is relieved of pressure via the auxiliary chamber 27, its connection 50 and the first valve assembly 63. The expansion ports 21 and 22 supply the master cylinder 3. When a vehicle in which the brake system 2 has been installed is put into operation, the motor 53 is switched on, so that the pump 54 pumps pressure medium from the refill container 14 into the pressure reservoir 55. The pressure switch 56 switches the motor 53 off once sufficient pressure has built up inside the pressure reservoir 55.

When the brake pedal 39 is actuated, the hollow tappet 35 is displaced toward the master cylinder 3 via the pedal lever 40 and the pedal tappet 41. In this process, the stop collar 36 moves farther away from the extension 37, and the control bushing 32 closes the control bore 45. As a result, a pressure-reducing connection between the auxiliary chamber 27 and the booster chamber 26 no longer exists. A further displacement of the control bushing 32 has the effect that the control bore 43 comes into alignment with the inflow bore 46. As a result, the pressure available in the pressure line 68 effects a pressure rise in the booster chamber 26, by means of the 4/2-way valve 69, the pressure supply connection 48, the circumferential groove 47, the control bore 43 and the connecting bores 44. A pressure thereby exerted on the booster piston 25 displaces it toward the master cylinder 3. The booster piston 25, in turn, via the auxiliary piston 28, displaces the first main cylinder 8 past the expansion port 21. As a result, there is a pressure rise between the first main piston 8 and the second main piston 9, which moves the second main piston 9 past its expansion port 22 and finally blocks off the master cylinder 3 with respect to the refill container. Subsequently, braking pressures arise in the brake circuits I and II. The pressure rising in the booster chamber 26 is also exerted on the tappet 35, however, so that the instantaneous pressure exerted on the booster piston 25 is perceptible at the brake pedal 39 in the form of an opposing force. If the opposing force becomes as strong as the force applied at the pedal 39 by the driver, then a distance between the booster piston 25 and the stop collar 36 increases, with the result that the control bore 43 is moved farther away from the inflow bore 46, so that the control bushing 32 blocks the inflow bore 46. This terminates the increase in pressure. If the brake pedal 39 is then released, then the control bores 42 and 45 come to coincide, and pressure escapes from the booster chamber 26 to the return line 57.

If a vehicle being braked by the actuation of the brake pedal 39 should move from a surface having particularly good adhesion to one with less adhesion, then there is the danger of wheel lock, or skidding, if the brake pedal 39 is actuated forcefully enough. This danger of wheel lock is recognized in a manner known per se by wheel rotation sensors, not shown, and by a control unit, also known but not shown. To eliminate the danger of wheel locking, which may be present for example at one or more wheels, the control unit switches the 4/2-way valve 69 into its second switching position. Hence no further pressure medium is available to the brake valve 5, and at the same time the booster chamber 26 is relieved of pressure in favor of the return line 57, via the connection 49. The pressure relief reduces the boosting force of the booster piston 25; hence this piston 25 can return at least partway toward its initial position, and as a result the main pistons 8 and 9 can also move toward their initial positions. The result is reductions of braking pressure in the master cylinder 3. These pressure reductions are reproduced in all or only one of the wheel brakes, depending on which of the brake pressure maintenance valves 59–62 are triggered. Via the wheel sensors already mentioned, the control unit learns whether the locking danger is disappearing, or not. If the danger of locking has passed, then the control unit causes the 4/2-way valve 69 to return to its basic position. The result is a renewed buildup of pressure in the booster chamber 26 because of a renewed supply of pressure to the brake valve 5 and because pressure medium is prevented from flowing out of the booster chamber 26.

If a sharply braked vehicle moves from a very adherent road surface onto ice, for instance, then the above-described pressure relief of the booster chamber 26 may not be adequate to cause the main pistons 8 and 9 to return far enough toward the expansion ports 21 and 22 that there will be a sufficient drop in braking pressure in the brake circuits I and II. An insufficient movement of the main pistons 8 and 9 toward their initial position may for instance occur if the brake pedal 39 is too forcefully actuated and causes the stop collar 36 to strike the booster piston 25, preventing the latter from returning to its initial position. Thus it is possible that merely the overly forceful actuation of the brake pedal 39, without any reinforcement provided by hydraulic booster pressure, may cause overbraking of a vehicle, for instance on an icy road. In the particular instance of an icy road, this has the disadvantage that the locked-wheel condition cannot be terminated by means of the 4/2-way valve 69, in its function as described thus far. This is where the invention takes over.

If the booster piston 25 is incapable of returning to its initial position shown, despite a continuing pressure relief via the line 49, then the piston travel sensor 51 indicates a remaining distance between the booster piston 25 and its initial position. From this, the control unit recognizes that despite a pressure relief by means of the 4/2-way valve 69, the booster piston 25 is maintaining a position in which the main piston 8, coupled via the auxiliary piston 38, maintains a braking pressure in the master cylinder 3. This braking pressure has a magnitude which prevents a reacceleration of a blocked wheel. From the indicated parameter of "piston travel", the control unit therefore recognizes that the brake pedal 39 has been actuated much too forcefully. The control unit now directs the first valve assembly 63 into the switching position in which the auxiliary chamber 27 is blocked relative to the return line 57 and communicates with the pressure supply line 58. This exerts pressure on the booster piston 25 in the direction of the tappet 35. As a result, the booster piston 25, via the stop collar 26, displaces the tappet 35, as well as the pedal tappet 41 and the brake pedal 39, counter to the actuation force acting on the brake pedal 39. The displacement of the booster piston 25, for instance as far as its initial position shown, then brings about the pressure drop in in brake circuits I and II that is required to overcome wheel slip, or skidding. Once the danger of skidding is past, the multi-position valve 64 and the safety valve 65 are directed back into their initial positions. As a result, by returning the 4/2-way valve to its basic position, braking pressure can again be built up in the brake circuits I and II by means of the booster piston 25. The safety valve 65 is intended for performing an emergency relief of the auxiliary chamber 27 in the event that the multi-position valve 64 is defective or dirty and consequently sticks in some other position than its basic position.

The multi-position valve 64 is preferably embodied as a 3/3-way valve, as shown in FIG. 1, with one switching position in which all three valve connections are blocked. By switching back and forth between this position and the switching position in which the multi-position valve 64 introduces pressure from the pressure supply line 58 into the auxiliary chamber 27, a pressure increase can be generated in stages in the auxiliary chamber 27. As a result, braking pressure can for instance be decreased slowly. If the multi-position valve 64 switches incrementally back and forth between its basic position and the position in which it blocks all the connections, then the speed with which the brake pressure increases in brake circuits I and II can be limited. This is known by the term "gradient switchover", or a graduated control.

As will be appreciated from the above description of the system in operation, the "piston travel" parameter is used to determine whether undesirable braking pressure is present within brake circuits I and II. By means of the braking pressure sensor 23 already mentioned, however, the parameter of "braking pressure" can also be measured directly. The sensors 23 and 51 can for instance be embodied as sensors of a known type which emit analog signals. In that case, a threshold switch is associated with the control unit, and by way of the threshold switch the magnitude of the parameter beyond which the multi-position valve 64 is activated can be selected. It is also possible, however, to supply the analog signals to a differentiator, which then announces a premature termination of braking pressure reductions to the control unit.

It should also be noted that if the danger of wheel locking is present, the multi-position valve 64 and the safety valve 65 can be triggered first, so as to urge the booster piston 25 counter to its boosting direction, for a first stage in braking pressure reduction. If this pressure imposition is insufficient, then the boosting can be interrupted by means of the 4/2-way valve 69, again in accordance with parameters. In principle, it would also be possible to trigger the first valve assembly 63 and the second valve assembly 69 simultaneously.

The possibilities described for being able to drop the braking pressures down to zero, despite panic braking at the brake pedal 39, are naturally applicable to master cylinders embodied differently from the tandem arrangement shown here.

Figure 2:
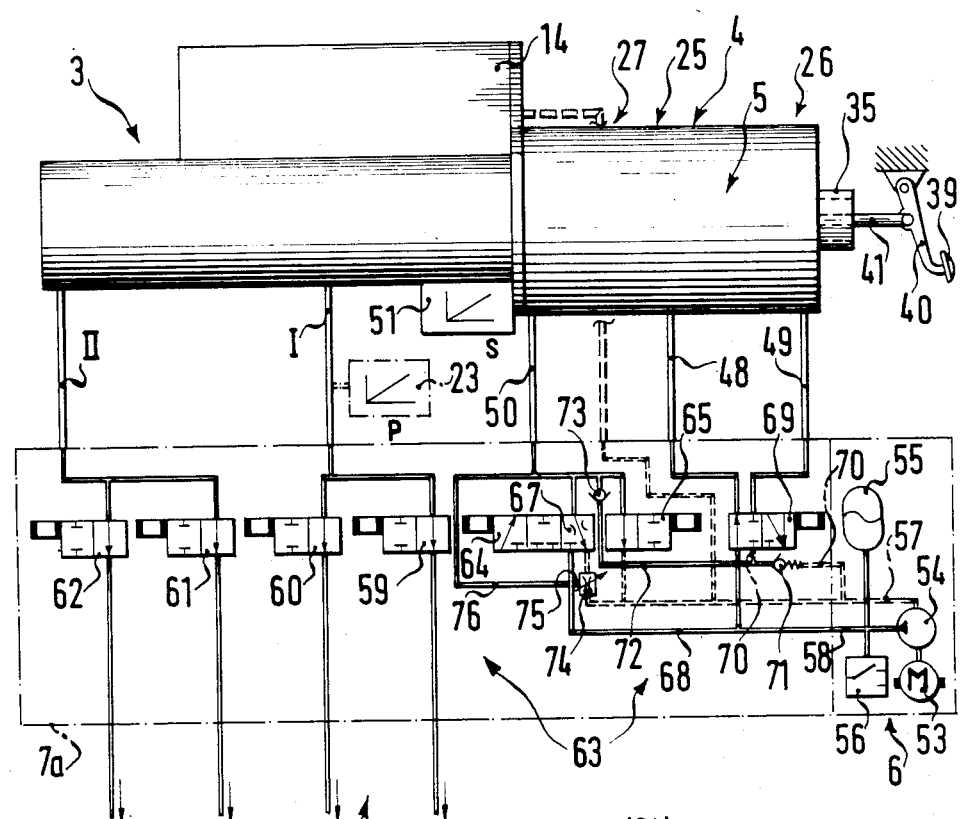
FIG. 2 shows a second exemplary embodiment of the brake system.

The second exemplary embodiment of a brake system 2a shown in FIG. 2, like the embodiment shown and described in conjunction with FIG. 1, has a master cylinder 3, a brake booster 4, a brake valve 5, a pressure supply device 6 and a valve block 7a, which differs from the valve block 7 of the first exemplary embodiment in that it includes additional elements.

Connected to the master cylinder 3 are again brake circuits I and II and the brake pressure sensor 23 already described. The brake booster 4 again includes a booster chamber 26 and an auxiliary chamber 27. The brake valve 5 is again controlled via a brake pedal 39, a pedal lever 40 and a pedal tappet 41 as well as via a tappet 35. A pressure supply connection 48 again serves to supply the brake valve 5. Connections 49 and 50 are intended to connect the booster chamber 26 and the auxiliary chamber 27 to the valve block 7a. The pressure supply device 6 again includes as its main component a pump 54 and a pressure reservoir 55.

The valve block 7a includes the brake pressure maintenance valves 59–62 described above, which are connected to the brake circuits I and II. The valve block 7a also accommodates the already-described first valve assembly 63, having the multi-position valve 64 and the safety valve 65, and the second valve assembly 69, which is embodied as a 4/2-way valve. Additionally, a further return line 70 is provided. This begins at the 4/2-way valve 69 and communicates with the return line 57 already described. A one-way pressure maintenance valve 71 is incorporated in the additional return line 70 between the 4/2-way valve 69 and the return line 57. This pressure maintenance valve 71 is for example embodied in a known manner as a spring-loaded ball valve and can be opened by means of a pressure, for example on the order of magnitude of 2 bar or more, in the direction of the return line 57. Between the 4/2-way valve 69 and this pressure maintenance valve 71, a line 72 which contains a one-way valve 73 is connected to the additional return line 70. The line 72 adjoins the connection 50 that connects the auxiliary chamber 27 to the 4/2-way valve 69. The one-way valve 73 is installed in such a way that when pressure is imposed on it from the 4/2-way valve 69, it opens toward the connection 50.

Figure 3:
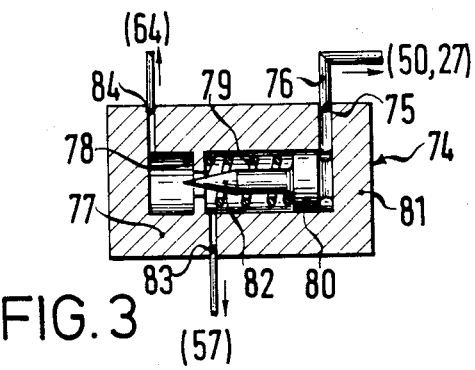
FIG. 3 is a detail, in longitudinal section, of a throttle shown in FIG. 2.

The valve block 7a also differs from the valve block 7 of the first exemplary embodiment in that a hydraulically controllable throttle 74 is installed between the multi-position valve 64 and the return line 57. This throttle 74 has a control inlet 75, which communicates with the auxiliary chamber 27 via a control line 76 and the connection 50. The throttle 74 is designed such that rising pressure at the control inlet 75 causes a narrowing of a throttle cross section. The throttle 74 may for instance be adopted from the prior art. A specific exemplary embodiment of the throttle 74 is shown in FIG. 3. The throttle 74 of this FIG. 3 has a cylinder 77 closed at both ends, in which an annular restrictor 78 is installed. A restoring spring 79 and an adjusting piston 80 are built in between one end of the cylinder 77 and the restrictor 78. The restoring spring 79 presses the adjusting piston 80 in the direction of one end of the cylinder 77, where the control inlet 75 is located. As a result, the restoring spring 79 counteracts the pressure that can be introduced through the control inlet 75 into the cylinder 77 in order to move the adjusting piston 80. Toward the restrictor 78, the adjusting piston 80 has a throttle body 82, for instance in the form of a cone. In the area between the restrictor 78 and the adjusting piston 80, the cylinder 77 has a connection 83, which communicates with the return line 57. Behind the restrictor 78, as viewed from the standpoint of the connection 83, there is a further connection 84, which communicates with the multi-position valve 64. It will be readily appreciated that any remaining cross section between the restrictor 78 and the throttle body 82 becomes narrower, the high a control pressure at the control inlet 75 rises.

MODE OF OPERATION OF THE SECOND EXEMPLARY EMBODIMENT

If the anti-locking mode arises, then the control unit, which may be embodied identically to that of the first exemplary embodiment, will control the valve assemblies 63 and 69. If the valve assembly 69, which as already mentioned may be embodied as a 4/2-way valve, is moved into the pressure reduction position, then pressure medium flows out of the booster chamber 26, thereby overcoming a flow resistance, through the pressure maintenance valve 71 and back to the return line 57. The pressure maintenance valve 71 has the effect of introducing a pressure, on the order of magnitude already mentioned, into the auxiliary chamber 27 through the line 72 and the one-way valve 73. If the booster piston 25, as a result of the pressure reduction induced by the 4/2-way valve 69, now executes a movement in the direction of the pedal lever 40, then the auxiliary chamber 27, the volume of which enlarges as a result of the displacement of the booster piston 25, will be immediately filled with pressure medium. If the pressure relief described causes gripping of all the wheels, the 4/2-way valve 69 is switched over into its position for increasing pressure. The auxiliary chamber 27, which is completely filled, without any empty spaces, by means of the line 72 and the one-way valve 73, and the throttle 67 now have the effect of preventing an undesirably steep rise in pressure in the brake circuits I and II. The filling of the auxiliary chamber 27 has the specific consequence that a hydraulic damping of the movement of the booster piston 25 begins immediately. In the event that a pressure relief in the booster chamber 26 is insufficient to reduce braking pressures in the brake circuits I and II far enough to reaccelerate one or more locked wheels, then the valve assembly 63 is switched over in the manner already described, so that the booster piston 63 is hydraulically compelled to move in the direction of its initial position.

The throttle 67 may for example be supplemented or replaced by the controllable throttle 74. As already described, this throttle 74 narrows a flow cross section to an increasing extent, the higher the pressure prevailing in the auxiliary chamber 27 is. Accordingly, beginning in the auxiliary chamber 27, a displacement resistance counteracts the booster piston 25, and this resistance is greater, the higher the pressure in the booster chamber 26. As a result, there is the advantage that the speeds of braking pressure increase in the brake circuits I and II have a substantially linear course. A "linearizing" of the speeds of braking pressure increase is adaptable to desired requirements, for instance by means of a particular shaping of the throttle body 82 and/or by selecting a particular characteristic curve for the restoring spring 79.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A method for automatically relieving a brake system during periods of skidding to prevent overbraking by an operator of said brake system having a master cylinder which contains at least one main piston; an associated brake booster, which includes a booster cylinder, a booster piston and a booster chamber defined by the booster piston and the booster cylinder; a brake valve, actuatable via a brake pedal, for directing booster pressure into the booster chamber; a pressure supply device which supplies the pedal-actuated brake valve with pressure via an electrically controllable valve assembly which is also connected to a return line, an auxiliary chamber which is located inside the booster cylinder between the booster piston and the master cylinder and which has a connection with a second electrically controllable valve assembly which has a connection with a pressure side of the pressure supply device and a return line leading to an impact side of said pressure supply device, comprising the steps of triggering said electrically controllable valve assembly to reduce a prevailing pressure in the booster chamber which acts upon the booster piston during braking in order to relieve the booster chamber of pressure and that if a braking pressure reduction threshold that is predetermined in a parameter dependent manner is not attained, applying a trigger control to said second electrically controllable valve assembly to apply a fluid under pressure to said booster piston in a direction toward the brake pedal to force said booster piston in a brake relaxing direction and thereby permit said at least one main piston to return to its non-braking position, thus relieving the brake system.

2. A brake system comprising a master cylinder, which contains at least one main piston with an associated brake booster, said brake booster includes a booster cylinder, a booster piston and a booster chamber defined by the booster piston and the booster cylinder; a pedal actuated brake valve, actuatable via a brake pedal for directing booster pressure into the booster chamber; a pressure supply device which supplies said pedal-actuated brake valve with fluid pressure; an auxiliary chamber which is located inside the booster cylinder between the booster piston and a wall of said master cylinder and a first line connection from said auxiliary chamber to said pressure supply device; an electrically controllable valve assembly connected to said connection line and to said pressure supply device, a return line leading from said electrically controllable valve assembly to an inlet side of said pressure supply device, a second electrically controllable valve assembly inserted between said pressure supply device and connected to said pedal-actuated brake valve via second and third line connections and via said return line to an inlet side of said pressure supply device, said second electrically controllable valve assembly in its basic position joins the pedal-actuated brake valve with the pressure supply device via said second line connection and upon being electrically switched over into its switching position, separates the pedal-actuated brake valve from the pressure supply device and relieves pressure in the booster chamber via said third line connection and said return line.

3. A brake system as defined by claim 2, characterized in that said booster chamber connects with said third line connection at a location that cannot be blocked by the booster piston and that the second valve assembly is embodied as a 4/2-way valve which is additionally connected with the booster chamber via said third line connection and in its basic position blocks the booster chamber from said third line connection and in its switching position relieves the booster chamber of pressure.

4. A brake system as defined by claim 2, characterized in that a control device is provided for controlling the first and second valve assemblies.

5. A brake system as defined by claim 3, characterized in that a control device is provided for controlling the first and second valve assemblies.

6. A brake system as defined by claim 4, characterized in that in an anti-skid mode, said control device controls said second valve assembly first, and then additionally controls said first valve assembly in a parameter-dependent manner.

7. A brake system as defined by claim 5, characterized in that in an anti-skid mode, said control device controls said second valve assembly first, and then additionally controls said first valve assembly in a parameter-dependent manner.

8. A brake system as defined by claim 6, characterized in that the control device controls said second valve assembly first, and then in a parameter-dependent manner controls said first valve assembly, such that said booster piston oriented toward said auxiliary chamber can be acted upon.

9. A brake system as defined by claim 7, characterized in that the control device controls said second valve assembly first, and then in a parameter-dependent manner controls said first valve assembly, such that said booster piston oriented toward said auxiliary chamber can be acted upon.

10. A brake system as defined by claim 8, characterized in that a piston travel sensor is provided for emitting parameters in accordance with the piston travel.

11. A brake system as defined by claim 9, characterized in that a piston travel sensor is provided for emitting parameters in accordance with the piston travel.

12. A brake system as defined by claim 8, characterized in that a brake pressure sensor is connected to the master cylinder for emitting parameters in accordance with the brake pressure.

13. A brake system as defined by claim 9, characterized in that a brake pressure sensor is connected to the master cylinder for emitting parameters in accordance with the brake pressure.

14. A brake system as defined by claim 2, characterized in that between a main piston and said booster piston there is an auxiliary piston which is connected to the booster piston and has a smaller diameter than the booster piston and that the brake valve is built into the combination of booster piston and auxiliary piston.

15. A brake system as defined by claim 2, characterized in that said first valve assembly is embodied such that in an additional switching position said auxiliary chamber can be tightly blocked, at least briefly, with respect to said pressure supply device and said return line.

16. A brake system as defined by claims 2, characterized in that by means of a control device, said first valve assembly can be actuated in increments, in order to retard a buildup of pressure.

17. A brake system as defined by claim 10, characterized in that said first valve assembly comprises a first multi-position valve and a safety valve disposed operationally parallel to it, said safety valve assuming its open position whenever the piston sensor and/or the brake pressure sensor, following the switchover from pressure reduction to pressure increase, does not indicate any brake pressure increase.

18. A brake system as defined by claim 2, characterized in that a prestressed pressure maintenance valve embodied in the manner of a check valve is built into a return line adjoining said second valve assembly that a line which is connected between this pressure maintenance valve and the second valve assembly bypasses said first valve assembly and communicates with the first line connection of the auxiliary chamber and also includes a one-way valve which can be opened toward the auxiliary chamber.

19. A brake system as defined by claim 2, characterized in that a hydraulically controllable throttle which is connected via a control inlet to the auxiliary chamber is built into a return line leading away from the first valve assembly toward the pressure supply device the flow cross section of the throttle being set to become narrower as the control pressure increases, such that despite a fluctuating level of booster pressure during pressure buildup, a substantially predetermined brake buildup speed is obtained.

20. A brake system as defined by claim 19, characterized in that the flow cross section of the throttle is linearly dependent on the control pressure.

21. A brake system as defined by claim 2, characterized in that a tubular extension begins at an end wall nearer the brake pedal, of the booster cylinder and extends toward the master cylinder at least partially and longitudinally displaceably receiving a tappet intended for actuating the brake valve and that the booster piston on its end oriented toward the end wall is embodied as hollow in such a manner that when it is displaced toward this end wall said booster piston surrounds the tubular extension with radial play.

* * * * *